(No Model.)
F. O. FISCHER.
Whiffletree.
No. 230,764.  Patented Aug. 3, 1880.
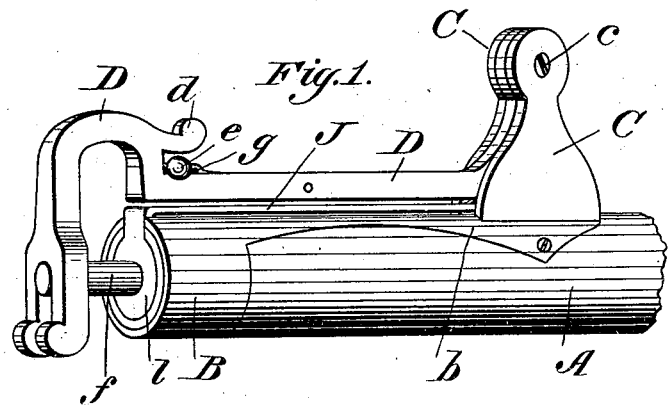
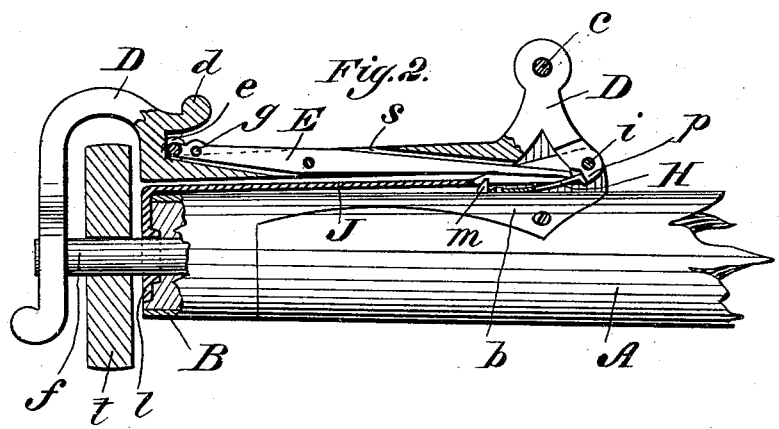
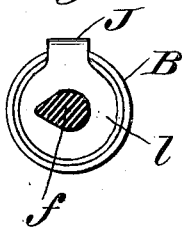
WITNESSES:
Donn I. Twitchell
C. Sedgwick
INVENTOR:
F. O. Fischer
BY Munn &Co
ATTORNEYS.

UNITED STATES PATENT OFFICE.

FERDINAND O. FISCHER, OF APTOS, CALIFORNIA.

WHIFFLETREE.

SPECIFICATION forming part of Letters Patent No. 230,764, dated August 3, 1880.

Application filed June 15, 1880. (No model.)

*To all whom it may concern:*

Be it known that I, FERDINAND OSCAR FISCHER, of Aptos, in the county of Santa Cruz and State of California, have invented a new and useful Improvement in Whiffletrees, of which the following is a specification.

The invention consists in combining a lever, spring, shouldered bar, and slide-bar having end disk, as hereinafter described.

In the accompanying drawings, Figure 1 is a perspective view of a portion of a whiffletree provided with my improvements. Fig. 2 is a longitudinal section, and Fig. 3 is a transverse section.

Similar letters of reference indicate corresponding parts.

A represents a portion of a whiffletree, of ordinary general form and description, having a ferrule on the end. The ferrule B has a shank, $b$, extending from it a suitable distance along the top of the whiffletree A toward the middle thereof, where it is secured by a screw or rivet.

At or near the inner end of the shank are two standards, C C, between which works one end of a bar, D, which is pivoted at $c$ in the upper part of the standards. From the pivot the bar extends downward toward the upper surface of the whiffletree; thence outward to the end of the whiffletree; thence upward, outward, and downward, forming a hook, the end of which is forked and straddles the trace-pin $f$, which projects from the end of the whiffletree.

On the bar D, near the point where it begins to turn to form the hook, is a projection, $d$, which forms a notch with its mouth toward the middle of the whiffletree. Between this point and the inner end of the bar is a vertical slot, $s$, in which is pivoted a lever, E. The outer end of the lever E works in the notch formed by the projection $d$, and said end is also provided with knobs $e$, which extend laterally beyond said projection, so as to be readily grasped by the hand. Between these knobs is an eye, $g$, to which a cord may be attached. The inner end of the lever E rests upon a spring, H, which presses upward on said inner end or long arm of the lever, so as to keep the outer end or short arm pressed downward on the bar D, and thus hold the hook portion of said bar in its engagement with the trace-pin $f$.

Between the bar D and the shank $b$ works a sliding bar, J, the outer end of which is bent downward and formed into a perforated disk, $l$, which works on the trace-pin $f$. The inner end of the bar J is pivoted at $i$ to the upright portion of the bar D at a point beyond a vertical line drawn from the point $c$, where said bar D is pivoted between the standards C. The inner end of said bar J may be slotted or forked, so as to allow the long arm of the lever E to engage with the spring H.

On the upper portion of the shank $b$ is an abutment, $m$, for the purpose of arresting the motion of the parts by engaging with a shoulder, $p$, on the bar D, near the pivot $i$, as hereinafter described.

The operation is as follows: When the trace is to be attached the knobs $e$ are grasped by the hand and pulled upward, so as to raise the lever E, and with it the hook portion of the bar D, so as to clear the pin $f$ and allow the trace to be slipped on said pin. On releasing the knobs the action of the spring H on the lever E causes the hook portion to resume its former position, so as to straddle the pin and hold the trace in place thereon. When the trace is to be detached the lever E is raised still higher than before. This causes the long arm of the lever to press the spring H down until it is clear of the shoulder $p$ of the bar D, so as to allow said bar to swing far enough to cause the sliding bar J, by its disk $l$, to push the trace $t$ off from the trace-pin $f$.

It will be seen that when both ends of the whiffletree are provided with the devices above described and cords are attached to the eyes $g$ the traces can be simultaneously detached by a person seated in the vehicle.

Having thus described my invention, I claim as new and desire to secure by Letters Patent—

The combination of the lever E, the spring H, the bar D, having shoulder $p$, and the slide-bar J, having end disk, $l$, to release the spring from the shank and push the trace from the pin $f$, as described.

FERDINAND OSCAR FISCHER.

Witnesses:
JOHN MANGELS,
ALEXANDER GETZREHMANN.